United States Patent
Irgens et al.

(10) Patent No.: US 6,846,002 B2
(45) Date of Patent: Jan. 25, 2005

(54) HITCH BALL LOCK

(75) Inventors: Christopher R. Irgens, Elm Grove, WI (US); John Weber, Thiensville, WI (US)

(73) Assignee: Master Lock Company, Oakcreek, WI (US)

( * ) Notice: Subject to any disclaimer, the term of this patent is extended or adjusted under 35 U.S.C. 154(b) by 0 days.

(21) Appl. No.: 10/209,291

(22) Filed: Jul. 30, 2002

(65) Prior Publication Data

US 2003/0020256 A1 Jan. 30, 2003

Related U.S. Application Data

(60) Provisional application No. 60/308,643, filed on Jul. 30, 2001.

(51) Int. Cl.[7] .................................................. B60D 1/06
(52) U.S. Cl. ....................................... 280/507; 280/511
(58) Field of Search ................................. 280/507, 511, 280/504

(56) References Cited

U.S. PATENT DOCUMENTS

| | | | |
|---|---|---|---|
| 3,796,074 A | | 3/1974 | Vik |
| 4,186,940 A | * | 2/1980 | Pillars ......................... 280/507 |
| 4,230,336 A | * | 10/1980 | Avrea et al. ................. 280/507 |
| 4,577,884 A | * | 3/1986 | Harris ......................... 280/507 |
| 4,772,039 A | | 9/1988 | Cook |
| 4,774,823 A | | 10/1988 | Callison |
| 4,836,570 A | * | 6/1989 | Lopez et al. ................. 280/507 |
| 4,989,892 A | | 2/1991 | Kevins et al. |
| 4,991,865 A | | 2/1991 | Francisco |
| 5,131,796 A | * | 7/1992 | Herum et al. ................ 411/222 |
| 5,280,941 A | * | 1/1994 | Guhlin ......................... 280/507 |
| 5,290,057 A | * | 3/1994 | Pellerito ...................... 280/507 |
| 5,378,008 A | * | 1/1995 | McCrossen .................. 280/507 |
| 5,480,171 A | | 1/1996 | Cheffey |
| 5,573,263 A | | 11/1996 | Denny et al. |
| 5,730,456 A | | 3/1998 | Bowers |
| 5,738,362 A | | 4/1998 | Ludwick |
| 5,743,548 A | * | 4/1998 | Gaspard ....................... 280/507 |
| 5,871,222 A | * | 2/1999 | Webb .......................... 280/511 |
| 5,873,271 A | * | 2/1999 | Smith ............................. 70/58 |
| 5,906,387 A | | 5/1999 | Wallace |
| 5,908,201 A | | 6/1999 | Van Vleet |
| 5,947,504 A | | 9/1999 | Milazzo |
| 6,062,583 A | * | 5/2000 | Lauricella, Jr. ............. 280/507 |
| 6,203,050 B1 | * | 3/2001 | Stech ........................... 280/507 |
| 6,206,400 B1 | * | 3/2001 | Stech ......................... 280/416.1 |
| 6,286,852 B1 | | 9/2001 | Slatten |
| 6,393,874 B1 | | 5/2002 | Zapushek et al. |
| 6,402,181 B1 | | 6/2002 | Lee |
| 6,406,052 B1 | * | 6/2002 | Bale ............................. 280/507 |
| 6,494,477 B1 | | 12/2002 | Parker |
| 6,588,790 B2 | | 7/2003 | Hall |

* cited by examiner

*Primary Examiner*—Lesley D. Morris
*Assistant Examiner*—L. Lum
(74) *Attorney, Agent, or Firm*—Calfee, Halter & Griswold LLP

(57) ABSTRACT

A lock assembly for securing a trailer including a hitch ball, a lock housing, a lock washer and a nut. The lock housing is placed over the lock washer and nut to prevent the nut from turning. A threaded portion of the hitch ball is placed through a hole in the lock housing and through the lock washer and nut to secure the hitch ball. When a trailer coupler is locked to the ball portion of the hitch ball, the trailer and hitch ball are secure from theft.

13 Claims, 4 Drawing Sheets

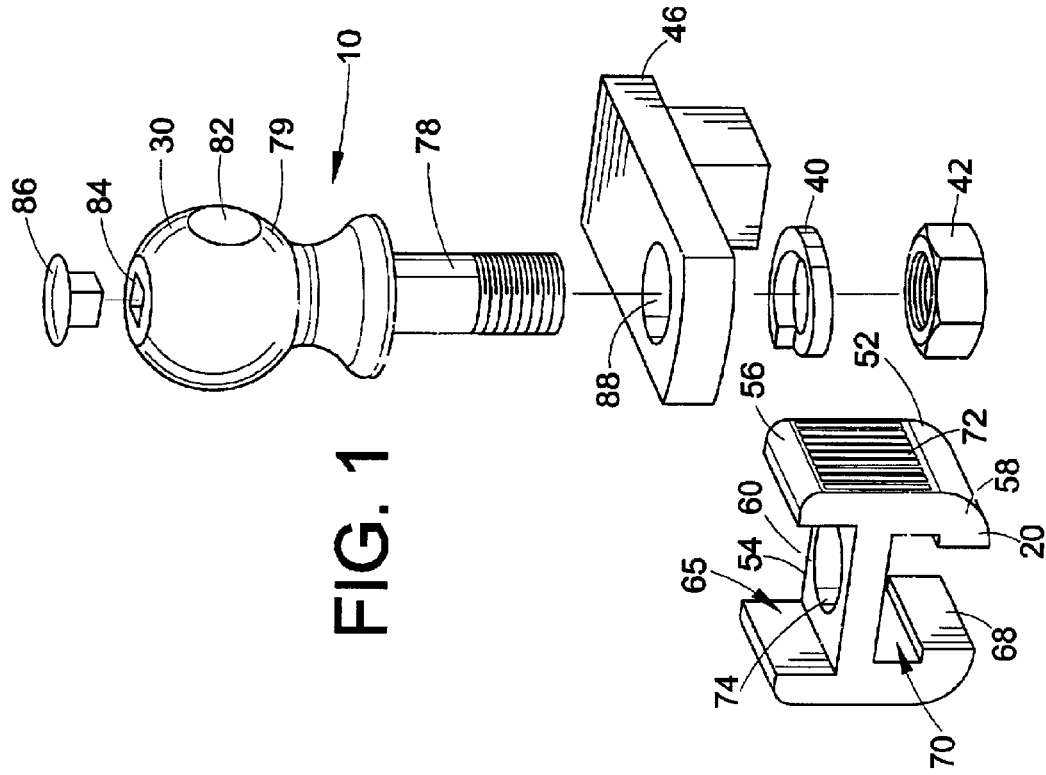
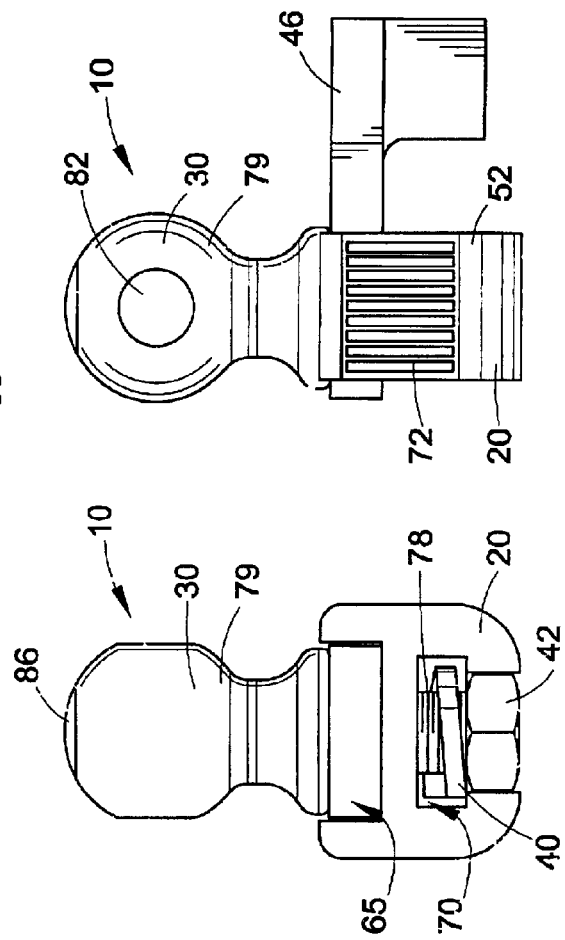
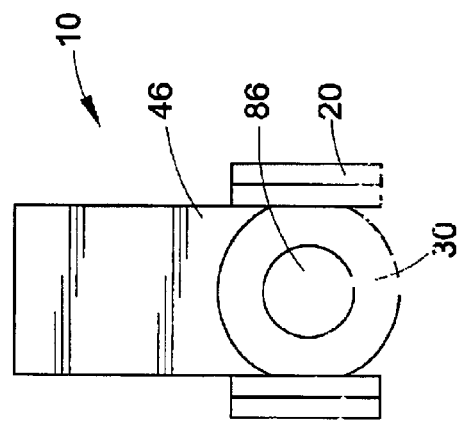

## HITCH BALL LOCK

CROSS-REFERENCE TO RELATED APPLICATIONS

This invention claims priority to U.S. Provisional Patent Application Ser. No. 60/308,643, filed Jul. 30, 2001.

FIELD OF THE INVENTION

The invention relates to a lock for a trailer hitch ball, and more specifically to a keyless trailer hitch ball lock.

BACKGROUND OF THE INVENTION

Automobile trailers are connected to the back of vehicles by hooking to a trailer hitch located on a draw bar. The trailer hitch coupler engages the trailer hitch ball and a coupler lock is provided to secure the trailer for towing and preventing the theft of the trailer. The draw bar is secured to the vehicle receiver by a draw bar lock. Conventional trailer lock assemblies incorporate both a draw bar lock and a coupler lock, but do not provide a means for securing the trailer hitch ball. Since the hitch ball can be removed from engagement with the draw bar, a trailer that is only secured by a conventional trailer lock assembly can be stolen.

Therefore, it is desirable to provide a lock that can secure a trailer hitch ball to prevent theft. It is further desirable to provide such a lock that be economically manufactured.

SUMMARY OF THE INVENTION

A lock assembly for use in combination with conventional trailer locks for securing a trailer and a lock for securing a hitch ball are provided. The lock includes a housing portion that secures the threaded portion of the hitch ball and prevents removal of the hitch ball when the hitch ball is engaged and locked by a trailer coupler.

In one embodiment, the lock assembly includes a hitch ball, a lock body, a lock washer and a nut. The nut is threaded onto the threaded portion of the hitch ball and the lock body prevents the nut from rotating.

In one embodiment the lock includes a two side members and one cross-bar member that intersects the side members. The cross-bar member has a hole for receiving the threaded member of a hitch ball. The lock further includes a first recess, formed by the side members and the cross-bar member, which receives a portion of a vehicle draw bar. In one embodiment, the lock includes a second recess, formed the side members and the cross-bar member, which receives a lock washer. The lock further includes two surfaces which are dimensioned to engage a nut placed on the end of a threaded member of a hitch ball. The engagement of the nut by the lock surfaces prevents the rotation of the nut and the removal of the hitch ball.

BRIEF DESCRIPTION OF THE DRAWINGS

The hitch ball lock of the present invention may be more readily understood by reference to the following drawings. While certain embodiments are shown as illustrative examples of the hitch ball lock, the scope of this application should not be construed as limited to these illustrative examples.

FIG. 1 is an exploded view of a trailer lock assembly of the present invention;

FIG. 2 is a front view of a trailer lock assembly in the locked position;

FIG. 3 is a side view of a trailer lock assembly in the locked position;

FIG. 4 is a top view of a trailer lock assembly of the present invention;

DETAILED DESCRIPTION OF THE INVENTION

Figure 5:
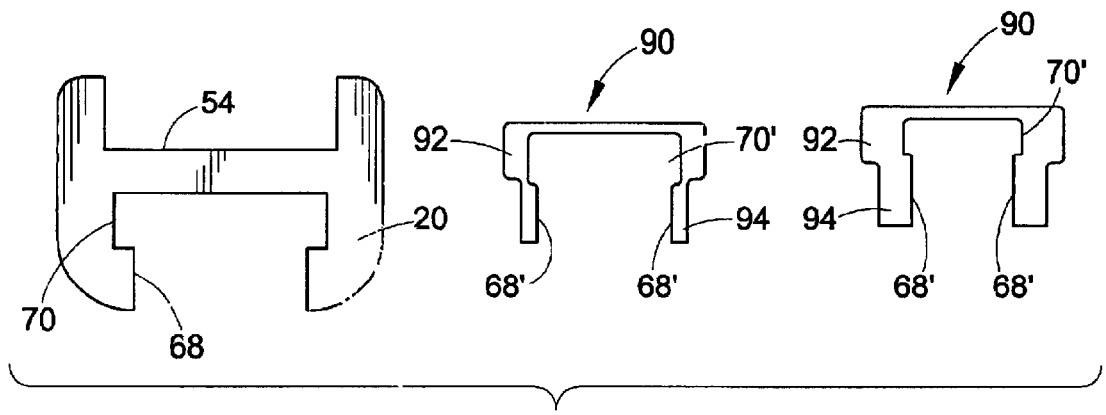
FIG. 5 illustrates a set of adapters for use with a hitch ball lock.

The present invention is a lock assembly, generally referenced as 10, including a hitch ball lock 20, a hitch ball 30, a lock washer 40 and a nut 42. The hitch ball 30 and the hitch ball lock 20 engage one end of a vehicle draw bar 46.

Figure 8:
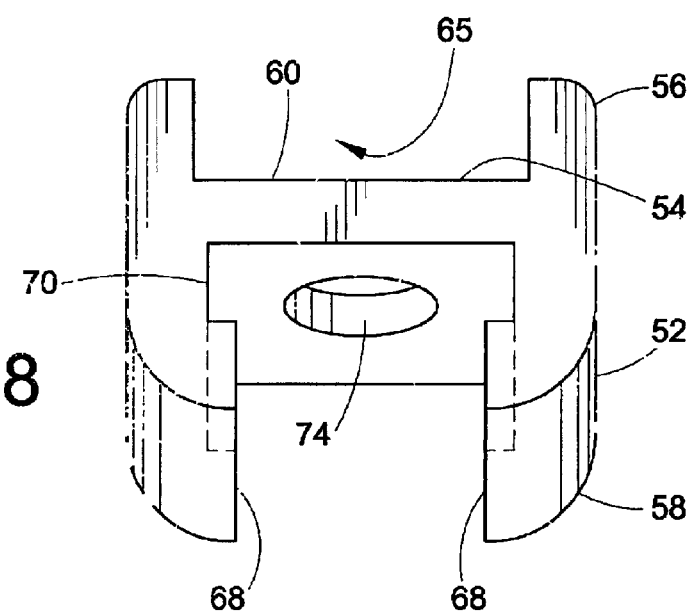
FIG. 8 illustrates a hitch ball lock of the present invention.
Figure 9:
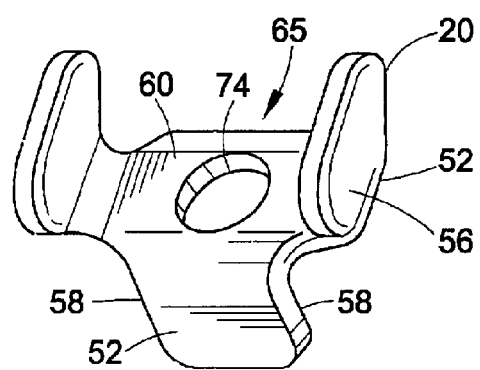
FIG. 9 is an alternative embodiment of the trailer lock assembly of the present invention.
Figure 10A:
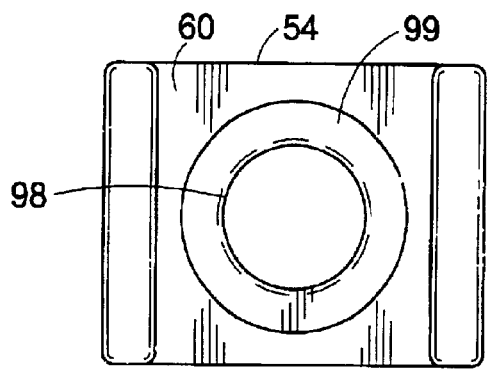
FIG. 10 is an alternative embodiment of the trailer lock assembly incorporating an integral treaded member.
Figure 10B:
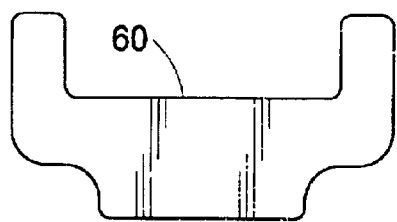
Figure 10C:
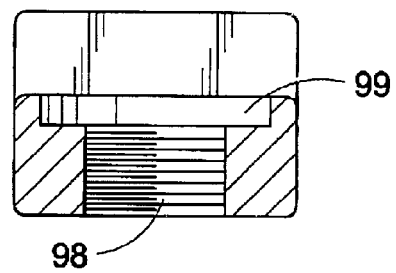

The hitch ball lock 20, as best shown in FIG. 8, is preferably a solid one piece metal unit made from extrusion, casting, forging or machining from the solid. Optionally, the hitch ball lock 20 can also be stamped and formed from sheet metal as shown in FIG. 9. The hitch ball lock 20 is generally H-shaped with two side members 52 and a cross-bar member 54. The side members 52 have an upper portion 56 and a lower portion 58 each extending away from the cross-bar member 54. The two upper portions 56 of the side members 52 of the hitch ball lock 20, along with the top surface 60 of the cross-bar member 54, provide a recess 65 for receiving the vehicle draw bar 46. By sliding or placing the vehicle draw bar 46 in the recess 65, the hitch ball lock 20 cannot be rotated. While the upper portions 56 of the side members 52 can be curved to secure the vehicle draw bar 46 within the recess 65, it is preferred that the upper portions 56 are generally straight so that the hitch ball lock 20 can be universally used with vehicle draw bars 46 of various thickness. The lower portions 58 of the side members 52 can be thicker at the bottom and have interlocking surfaces 68 for securing the nut 42. When the nut 42 is engaged by interlocking surfaces 68, the nut 42 cannot be rotated, and therefore cannot be removed. In the embodiment shown in FIG. 8, a recess 70 is formed below the cross-bar member 54 to allow placement of the lock washer 40. If the hitch ball lock 20 was to be used without a lock washer 40 or if the lock washer 40 used was the same or smaller in size than the diameter of the nut 42, recess 70 would not be needed and the lower portions 58 of the side members 52 could extend downward from the cross-bar member 54 with a universal diameter, equivalent to the diameter of the nut 42. Furthermore, as shown in FIG. 10, a slot 71 can be incorporated into either surface the cross-bar member 54 to house the lock washer 40. While the upper portions 56 and lower portions 58 can be in the same plane, as shown in FIG. 8, the upper portions 56 and lower portions 58 can be rotated 90 degrees from one another as shown in FIG. 9. Optionally, the side members 52 can gripping surfaces 72 to allow for easier handling of the hitch ball lock 20. The cross-bar member 54 has a hole 74 positioned and dimensioned for receiving the threaded portion 78 of the hitch ball 30.

Figure 11:
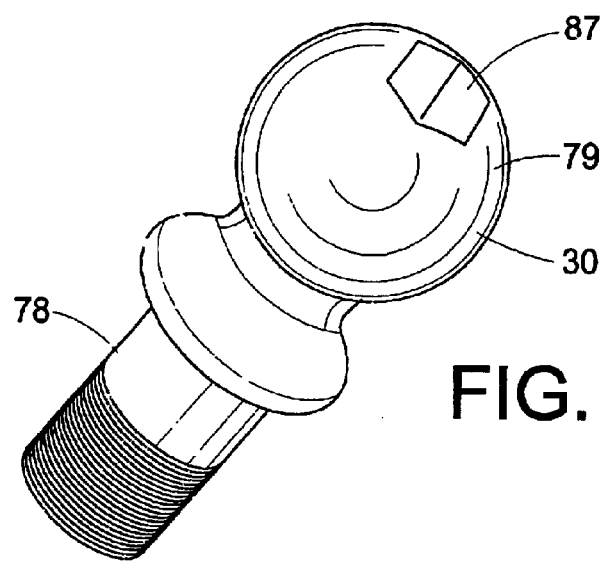
FIG. 11 is an alternative embodiment of a trailer hitch ball incorporating a hex drive.

The trailer hitch ball 30 can be a variety of known trailer hitch balls providing it includes a ball portion 79 and a threaded portion 78. The ball portion 79 is engaged by the trailer coupler 80 and locked into such engagement by a trailer coupler lock (not shown). Preferably, the trailer hitch ball 30 has at least one drive surface that is not accessible when the trailer coupler 80 is engaged. In the embodiment shown is FIG. 1, the hitch ball 30 has a set of side wrench flats 82 and an end drive socket 84 with end plug 86 to shield the drive socket from water and dirt. When engaged with the trailer coupler 80 both the side wrench flats 82 and the end drive socket 84 are covered by the trailer coupler 80 thereby preventing the trailer hitch ball 30 from being unscrewed. In another embodiment, shown in FIG. 11, the hitch ball 30 has a hex drive 87 located on the top portion of the ball portion 79. The hex drive 87 can also be fitted with a cap to shield the hex drive from water and dirt.

To engage the lock assembly 10, the lock washer 40 is inserted into the recess 70 and the nut 42 is place between the interlocking surfaces 68 and both the lock washer 40 and the nut 42 are aligned with hole 74. Hitch ball lock 20 is then positioned by sliding the recess 65 around the vehicle draw bar 46 and aligning the hitch ball lock hole 74 with the draw bar hole 88. The threaded portion 78 of the hitch ball 30 is placed through holes 74 and 88 and then driven through nut 42 preferably using drive surfaces 82 or 84. When a trailer coupler 80, with a trailer coupler lock, is secured to the ball portion 79 of the hitch ball 30, the trailer hitch ball 30 cannot be removed since the drive surfaces 82 and 84 are covered by the trailer coupler 80 and the nut 42 is engaged by the hitch ball lock 20.

Figure 6:
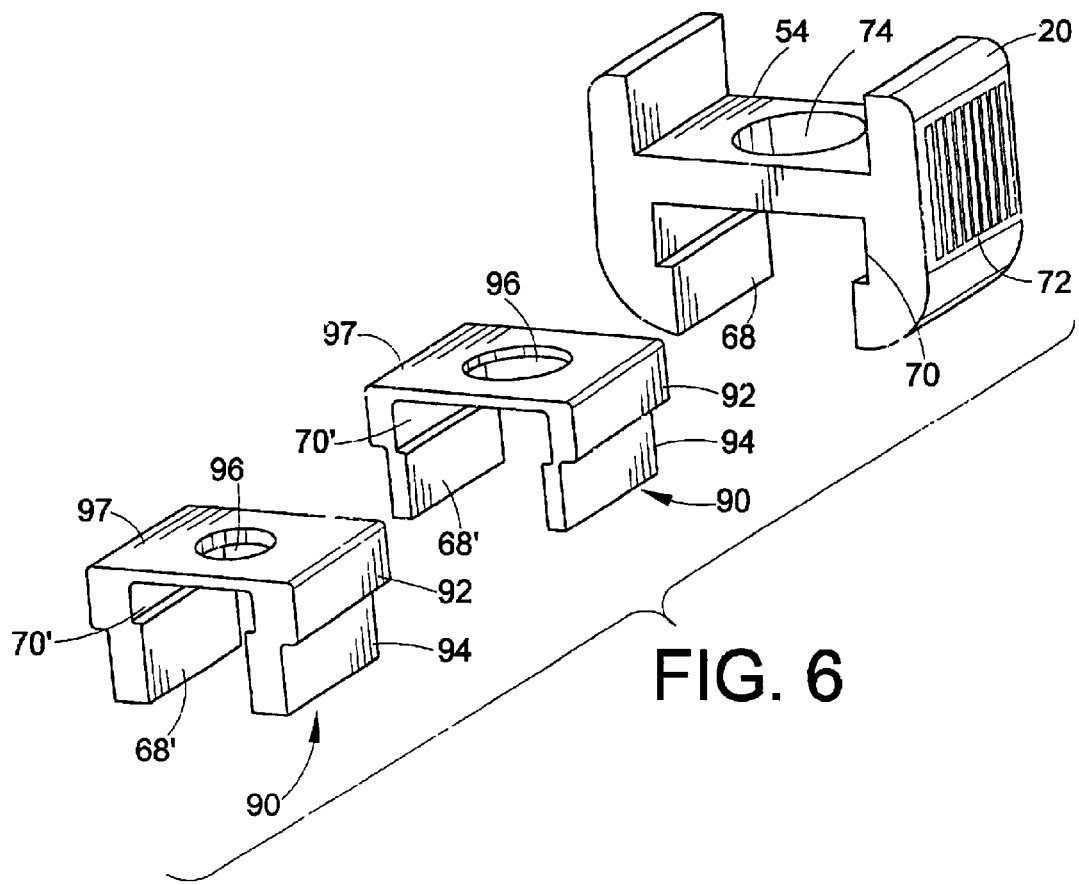
FIG. 6 is a perspective view of a hitch ball lock and adapters.
Figure 7:
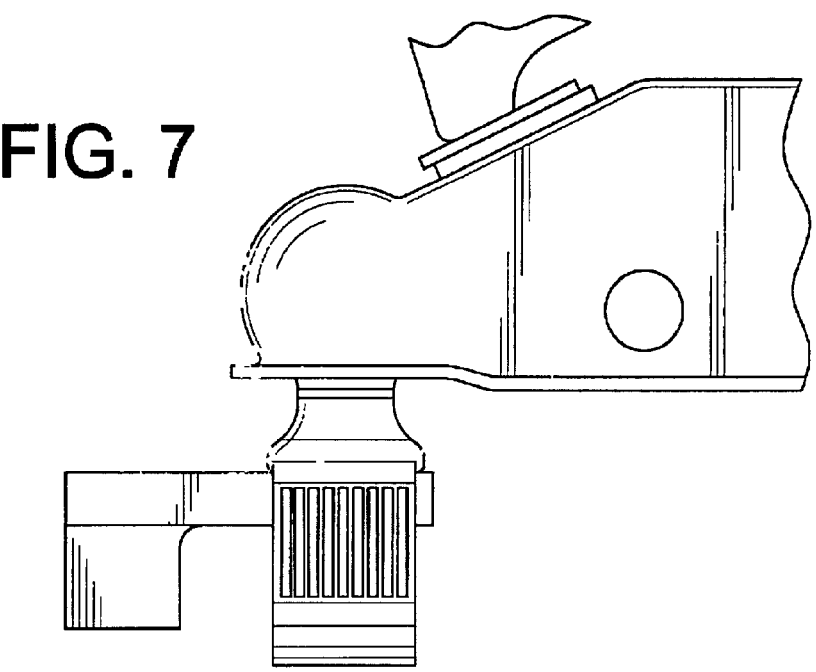
FIG. 7 illustrates a trailer lock assembly engaged by a trailer coupler.

As shown in FIGS. 5 and 6, one or more adapters 90 can be used to accommodate different nut 42 sizes. An adapter 90 can slide into the hitch ball lock 20 under the cross-bar member 54 and the protruding members 92 of the adapter 90 slides into the lock washer recess 70. Each adapter 90 is formed similar to the bottom portion of the hitch ball lock 20, with lower side portions 94, interlocking surfaces 68' and a lock washer recess 70'. As such, additional adapters 90 can be used until the distance between the interlocking surfaces 68' is small enough that the tolerance between the interlocking surfaces 68' and the nut 42 prohibits the nut from turning. Each adapter 90 can be secured into place by inserting the threaded portion 78 of the hitch ball 30 through the hole 96 in the top 97 of each adapter 90.

In another embodiment, the lock washer 40 and nut 42 are replaced by a threaded hole in the bottom of the hitch ball lock 20. This embodiment has less components than other embodiments, however, it does not take advantage of the joint pre-load that the lock washer 40 maintains during vibration of the lock assembly 10. In order to provide a more positive thread lock, this embodiment may include a thread patch or insert into the threaded joint. In other embodiment, as show in FIGS. 10A–10C, the nut 42 is replaced by an integral threaded hole 98 and a lock washer 40 is placed in a slot 99 in the top surface 60 of the cross-bar member 54.

It should be appreciated that the lock assembly 10 may have different configurations and different designs and that such designs are apart of the invention as they are provided for within the scope of the claims.

What is claimed is:

1. A lock for securing a hitch ball comprising:
    at least two side members and at least one cross-bar member that intersects said side members and has an aperture for receiving a threaded member of a hitch ball;
    a first recess formed by at least two side members and at least one cross-bar member, wherein said recess is dimensioned to receive a portion of a vehicle draw bar; and
    at least two surfaces dimensioned to engage a nut placed an the end of the threaded member of a hitch ball; wherein such engagement prevents rotation of the nut.

2. The lock of claim 1 further comprising a second recess formed by at least two side members and a second surface of at least one cross-bar member.

3. The lock of claim 1 further comprising a slot formed on one surface of said cross-bar member.

4. The lock of claim 1 further comprising an integral threaded member formed as part of said lock.

5. The lock of claim 2 further comprising one or more adapters placed within said second recess and having at learn two surfaces fur engaging a nut.

6. A trailer lock assembly comprising:
    a hitch ball having a ball portion and a threaded portion;
    a lock housing with a aperture for receiving the threaded portion of said hitch ball; and
    a threaded member for receiving the threaded portion of said hitch ball;
    wherein said threaded member is at least partially enclosed by a portion of the lock housing such as to prevent rotation of said threaded member;
    wherein the bitch ball has a set of wrench flats positioned on the hitch ball such that the drive surface is not accessible when a trailer coupler is placed over the hitch ball.

7. The trailer lock assembly of claim 6 further comprising one or more adapters placed within a second recess and having at least two surfaces for engaging a nut.

8. The trailer lock assembly of claim 6, wherein the lock housing further comprises:
    at least two side members and at least one cross-bar member that intersects said side members and contains a hole for receiving the threaded portion of a hitch ball;
    a first recess formed by a least two side members and a first surface of at least one cross-bar member, wherein said recess is dimensioned to receive a portion of a vehicle draw bar;
    a second recess formed by a least two side members and a second surface of at least one cross-bar member; and
    at least two surfaces dimensioned to engage a nut placed on the end of a threaded member of a hitch ball; wherein such engagement prevents the rotation of the nut.

9. The trailer lock assembly of claim 8 further comprising a lock washer, wherein said lock washer is disposed within said second recess.

10. The trailer lock assembly of claim 6, wherein the threaded member for receiving the threaded portion of the hitch ball is a nut.

11. The trailer lock assembly of claim 6, wherein the threaded member for receiving the threaded portion of the hitch ball is a threaded member that is integral with the housing.

12. A trailer lock assembly comprising:
    (a) a hitch ball having a ball portion, a threaded portion, and at least one drive surface positioned on the hitch ball such that the drive surface is not accessible when a trailer coupler is placed over the hitch ball;
    (b) a look housing comprising:
        (i) at least two side members and at least one cross-bar member that intersects said side members and has a hole for receiving a threaded member of a hitch ball;
        (ii) a first recess formed by a least two side members and a first surface of at least one cross-bar member, wherein said recess is dimensioned to receive a portion of a vehicle draw bar;

(iii) a second recess formed by at least two side members and a second surface of at least one crossbar member; and (iv) at least two surfaces dimensioned to engage a nut placed on the end of a threaded member of a hitch ball; wherein such engagement prevents rotation of the nut; and (c) a lock washer disposed within said second recess of said lock housing; and (d) a nut disposed between two surfaces of said lock housing.

13. A trailer lock assembly comprising a hitch ball including a ball portion, base portion, and threaded portion, a lock housing including a recess, and having at least two surfaces for engaging a first means for securing said hitch ball, and, one or more adapters that fit within said recess, wherein said lock housing includes a second means for preventing removal of said first means.

* * * * *